United States Patent [19]

Meagher

[11] Patent Number: 4,941,253

[45] Date of Patent: Jul. 17, 1990

[54] VEHICLE WHEEL-TO-HUB STUD ALIGNMENT AND MOUNTING TOOL

[76] Inventor: Thomas F. Meagher, 9 Lookout Ter., Lynn, Mass. 01902

[21] Appl. No.: 438,066

[22] Filed: Nov. 20, 1989

[51] Int. Cl.$^5$ .............................................. B25B 27/14
[52] U.S. Cl. ........................................................ 29/273
[58] Field of Search .............................. 29/273; 81/488

[56] References Cited

U.S. PATENT DOCUMENTS

| | | | |
|---|---|---|---|
| Re. 20,737 | 5/1938 | Kehl | 81/488 |
| 1,494,269 | 5/1924 | Meyers | 29/273 |
| 1,969,233 | 8/1934 | Patterson | 29/273 |
| 1,999,206 | 4/1935 | Patterson | 29/273 |
| 2,499,758 | 3/1950 | Kayfetz | 29/273 |
| 2,662,331 | 12/1953 | Borup | 87/488 |
| 2,708,712 | 5/1955 | Jamieson | 29/273 |
| 2,770,873 | 11/1956 | Ramsey | 29/273 |
| 3,389,453 | 6/1968 | Tarter et al. | 29/273 |

Primary Examiner—P. W. Echols
Attorney, Agent, or Firm—Fleit, Jacobson, Cohn, Price, Holman & Stern

[57] ABSTRACT

An elongated shank-type tool is provided including a handle on one end and an integral open convolution coil on the other end to be threadingly passed through a mounting stud receiving opening in a wheel after which the coil may be engaged over a vehicle hub wheel mounting stud, the handle end of the tool may be raised to elevate an associated wheel in alignment with the studs on the wheel hub and the lower portion of the wheel may be displaced inwardly toward an associated wheel hub for engaging the lower studs through the corresponding stud receiving openings. After a lug nut has been threaded on a lower stud, the coil may be disengaged from the associated wheel mounting hub stud and threaded back through the associated mounting stud receiving opening.

9 Claims, 1 Drawing Sheet

U.S. Patent
Jul. 17, 1990
4,941,253
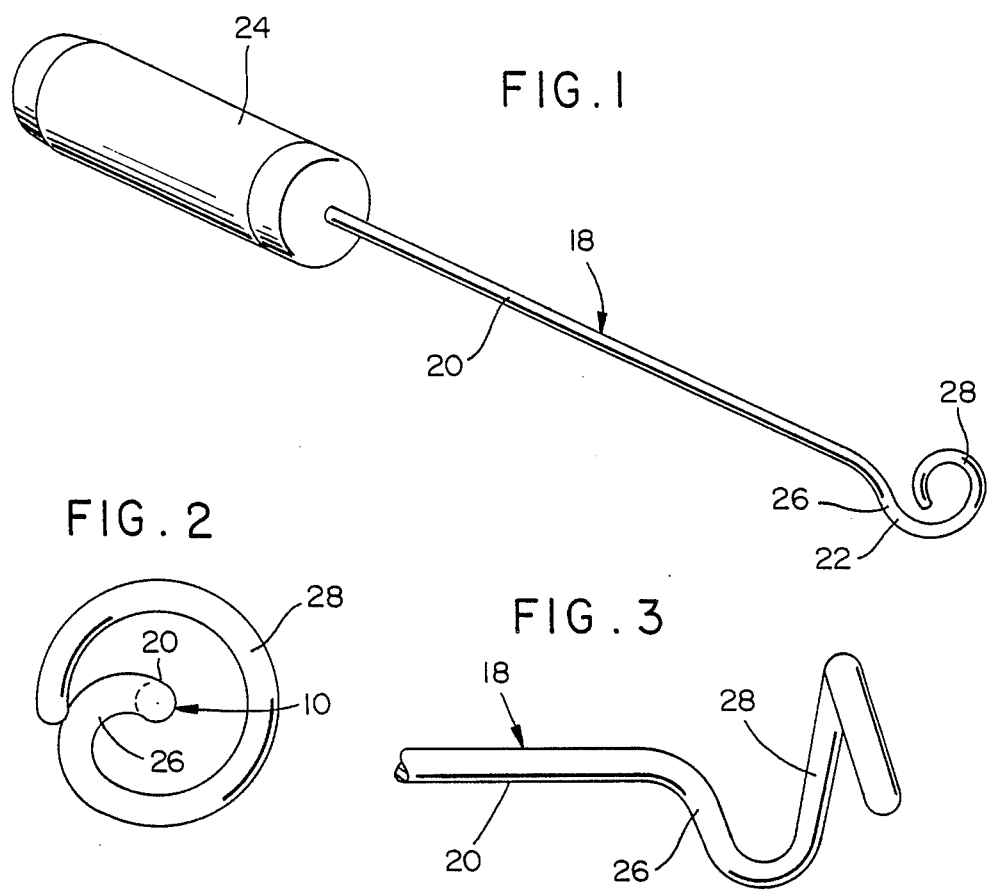
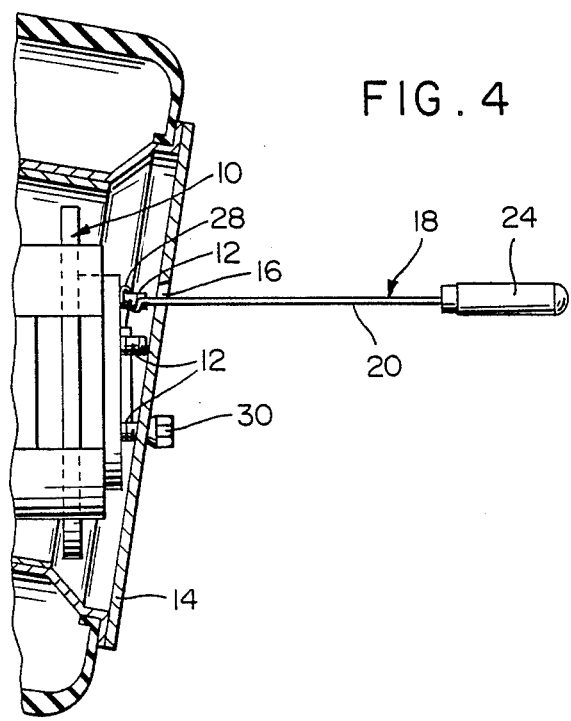

VEHICLE WHEEL-TO-HUB STUD ALIGNMENT AND MOUNTING TOOL

BACKGROUND OF THE INVENTION

1. Field of the Invention

This invention relates to an elongated shank-type tool including an open convolution coil terminal end on one end and a handle on the other end. The tool is inserted through the uppermost wheel mounting stud receiving opening in the center portion of a vehicle wheel and the coil is engaged over the uppermost stud on the wheel hub. The tool is then used as a lever and guide for lifting the tool up to the level of the stud and guiding the wheel into position for support from the stud.

2. Description of Related Art

Various different forms of wheel mounting tools including some of the general structural and operational features of the instant invention are disclosed in U.S. Pat. Nos. 1,494,269, 1,969,233, 1,999,206, 2,499,758, 2,708,712 and 2,770,873. However, these previously known forms of tools do not include the overall combination of structural and operational features incorporated in the instant invention.

SUMMARY OF THE INVENTION

The tool of the instant invention includes a first open convolution coil end and a second handle end. The coil end is of a diameter too great to pass axially through a mounting stud receiving opening in a vehicle wheel, but may be threaded therethrough. Then, the coil end of the tool is engaged over the uppermost mounting stud on a vehicle hub and the tool is used as a lever and guide for guiding the associated vehicle wheel into position for disposition over the wheel mounting studs of the hub, the lower openings in the wheel being first engaged over the lower wheel mounting studs with the upper portion of the wheel tilted outwardly relative to the wheel mounting hub and the coil end of the tool is then disengaged from the uppermost stud and threaded back out through the uppermost stud receiving bore in the vehicle wheel, after which the upper part of the wheel may be swung inwardly toward the associated vehicle wheel mounting hub for reception of the upper wheel mounting studs through the corresponding upper stud receiving openings of the wheel.

The main object of this invention is to provide a wheel-to-hub stud alignment and mounting tool for facilitating support of a vehicle wheel and tire above the ground and movement of the wheel and tire into position with the wheel properly mounted upon wheel mounting studs of an associated elevated vehicle wheel mounting hub.

Another object of this invention is to provide a tool in accordance with the preceding object and which may be utilized, with ease and efficiency, by mechanics as well as vehicle owners who find it necessary to demount and remount a vehicle wheel.

Yet another object of this invention is to provide a tool adaptable for use in conjunction with substantially all passenger and light truck vehicles.

A still further object of this invention, in accordance with the immediately preceding object, is to provide a tool which may be manufactured in different sizes so as to also be operable in conjunction with heavy truck wheels.

A final object of this invention to be specifically enumerated herein is to provide a tool in accordance with the preceding objects and which will conform to conventional forms of manufacture, be of simple construction and easy to use so as to provide a device that will be economically feasible, long-lasting, and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a perspective view of a tool constructed in accordance with the present invention;

FIG. 2 is an enlarged end elevational view of the tool as seen from the right side of FIG. 1;

FIG. 3 is an enlarged fragmentary side elevational view of the coil end of the tool; and FIG. 4 is a fragmentary vertical sectional view illustrating the manner in which the tool may be utilized for supporting a wheel and tire combination in elevated position relative to an associated vehicle hub and with the vehicle wheel partially mounted upon the lower studs of the hub immediately preparatory to disengagement of the coil end of the tool from an upper wheel stud and being threaded back through the associated wheel stud receiving opening.

DESCRIPTION OF THE PREFERRED EMBODIMENT

Referring now more specifically to the drawings the numeral 10 generally designates a vehicle wheel hub portion of conventional design and including five outwardly projecting wheel mounting studs 12. The hub portion 10 is of the type utilized with disc brakes and an associated vehicle wheel 14 is illustrated, see FIG. 4, in partially supported position from the lowermost studs 12 of the hub portion 10, the vehicle wheel 14 including a central portion having mounting stud receiving openings 16 formed therethrough.

The tool of the instant invention is referred in general by the reference numeral 18 and comprises an elongated shank 20 having an open convolution coil 22 on one end and a diametrically enlarged handle 24 on the other end.

The handle 24 comprises one end portion of the shank 20 and the coil 22 comprises a second end of the shank 20. The coil 22 and handle 24 are joined by the intermediate shank member section comprising the shank 20 extending therebetween. The end portion or coil 22 comprises a wheel stud engaging end of the tool and includes a first portion 26 defining an inclined laterally outwardly directed integral portion of the shank 20 and the first portion 26 curves smoothly into an open convolution second free end portion 28 which is generally 360° in angular extent.

The second portion 28 is substantially coaxial with the shank 20 and the first portion 26 curves smoothly into the shank 20.

Because the openings 16 are only slightly greater in diameter than the studs 12 and are slightly beveled to receive the inner beveled end (not shown) of a wheel lug 30, the second portion 28 of the tool 18 will not move axially through the opening 16 and still be engagable over the stud 12. However, because the second portion 28 is of open convolution design, the second free end portion 28 may be threaded through the opening 16.

After the second free end portion 28 has been threaded through the opening 16, it is telescoped over the uppermost stud 12 and the wheel 14 is slid along the shank 20 from the handle end 24 thereof toward the second free end portion 28. When the wheel 14 reaches a position closely adjacent, but spaced from, the portion 26, the handle end 24 is elevated until the two lowermost openings 16 of the wheel 14 are aligned with and may be slipped over the two lowermost studs 12 of the hub portion 10. After the lower portion of the wheel 14 has been cocked inwardly to be engaged over the lowermost studs 12 and the two lowermost lug nuts 30 have been loosely threaded onto the two lowermost studs 12, the handle end of the tool 18 is lowered and the second portion 28 is slipped axially off the uppermost stud 12 and threaded back through the uppermost opening 16. Then, the upper portion of the wheel 14 is displaced inwardly to engage the remaining upper mounting studs 12 of the hub portion 10 through the upper openings 16 in the wheel 14. Of course, the remainder of the lugs 30 are then applied over the remaining studs 12 and tightened.

Although similar tools have been provided such as that disclosed in U.S. Pat. No. 1,494,269 for engagement over a vehicle wheel mounting stud, present day vehicle wheels have stud receiving openings formed therein that are only slightly greater in diameter than the corresponding wheel mounting studs and it is substantially impossible to provide a socket such as that designated at (13) in U.S. Pat. No. 1,494,269 of sufficiently thin wall portions to be of an inside diameter sufficient to slip over a wheel mounting stud and yet include an outside diameter sufficiently small enough to be received through an associated wheel stud receiving opening. Furthermore, U.S. Pat. Nos. 1,969,233 and 1,999,206 disclose wheel mounting tools equipped with wheel stud thread engaging lips or flanges, but such flanges are sometimes not properly engaged with the associated stud threads and slip from engagement therewith, causing possible injury to a person using these wheel mounting tools.

With the instant invention the open convolution coil second free end portion 28 is of sufficient axial extent to slip well over the associated wheel stud and is of sufficient thickness material to support the weight of the associated wheel 14. Further, the second free end portion 28 may be withdrawn (threaded) outwardly through the opening 16 after the bottom two studs 12 of the hub portion 10 have been engaged through the corresponding bottom two openings (not shown) formed in the wheel 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vehicle wheel-to-hub stud and alignment tool including an elongated shank member having a first handle end and a second wheel stud engaging end and an intermediate shank member section extending between said ends, said second wheel stud engaging end including a first portion integral with and forming an extension of the adjacent portion of said intermediate shank member section directed laterally outwardly from the shank member and terminating outwardly in an open convolution free end portion loosely telescopingly engagable over the free end of a vehicle hub wheel mounting stud, said open convolution free end portion being threadable through a vehicle wheel mounting stud receiving opening.

2. The tool of claim 1 wherein said first portion curves smoothly outwardly from the adjacent portion of said intermediate shank member section.

3. The tool of claim 2 wherein said first portion curves smoothly into said open convolution free end portion.

4. The tool of claim 3 wherein said open convolution free end portion is of generally constant radius of curvature.

5. The tool of claim 4 wherein said open convolution free end portion is generally 360° in angular extent.

6. The tool of claim 5 wherein the pitch of said open convolution free end portion is at least slightly greater than the thickness of a typical vehicle wheel center portion having mounting stud receiving openings formed therein.

7. In combination, a wheel mounting stud equipped vehicle wheel hub and a vehicle wheel including a center portion having openings formed therein for mounting on said studs, an elongated shank member including a first handle end and a second wheel stud engaging end and an intermediate shank member section extending between said ends, said second wheel stud engaging end including a first portion integral with and forming an extension of the adjacent portion of said intermediate shank member section directed laterally outwardly from the shank member thereof and terminating outwardly in an open convolution free end portion, said free end portion being threadingly receivable through one of said openings and telescopingly engagable over the free end of one of said studs.

8. The combination of claim 7 wherein the pitch of said open convolution free end portion is at least slightly greater than the thickness of said vehicle wheel center portion about said openings, said open convolution free end portion having an inside diameter slightly greater than the outside diameter of said studs and an outside diameter greater than the diameter of said openings.

9. The method of mounting a vehicle wheel on a journaled wheel hub portion having outwardly projecting, threaded wheel mounting studs thereon and wherein said wheel center portion is equipped with openings therein through which said studs are snugly receivable, said method including providing an elongated shank-type tool including a first handle end and a second wheel stud engaging end and wherein said second wheel stud engaging end includes a first portion integral with and forming an extension of the adjacent portion of said shank member directed laterally outwardly from the shank member and terminating outwardly in an open convolution free end portion snugly slidingly engagable over one of said studs and wherein the outside diameter of said free end portion is greater than the diameter of said openings and the inside diameter thereof is slightly greater than the diameter of said studs, threading said free end portion through a stud receiving opening in said wheel, slidingly engaging said free end portion over one of said studs, raising the first handle end of said tool to utilize said tool as a lever to raise said wheel to a position with the last mentioned opening generally aligned with the last mentioned stud, tilting the bottom of said wheel inwardly to engage at least one of the lowermost studs through a corresponding opening in said wheel, threadingly engaging a wheel lug on the last mentioned stud to ensure support of said wheel from said hub, slidably disengaging said free end portion from the associated stud, threading said free end portion back through the opening through which said shank was passed, and then tilting the upper portion of said wheel toward said hub and a position with the remaining studs received through the corresponding openings of said wheel, and thereafter applying the remaining lug nuts to the corresponding studs and tightening the lug nuts thereon.

* * * * *